United States Patent

Zernickel

[11] Patent Number: 6,015,238
[45] Date of Patent: Jan. 18, 2000

[54] ROLLING BEARING FOR ROTARY MOVEMENTS

[75] Inventor: Alexander Zernickel, Herzogenaurach, Germany

[73] Assignee: INA Walzlager Schaeffler oHG, Germany

[21] Appl. No.: 09/119,433

[22] Filed: Jul. 20, 1998

[30] Foreign Application Priority Data

Aug. 7, 1997 [DE] Germany .......................... 197 34 134

[51] Int. Cl.[7] .................................................. F16C 33/36
[52] U.S. Cl. ........................ 384/565; 384/455; 384/548
[58] Field of Search .................................. 384/550, 565, 384/566, 568, 571, 452, 455, 548, 604

[56] References Cited

U.S. PATENT DOCUMENTS

| | | | |
|---|---|---|---|
| 1,193,276 | 8/1916 | Lockwood | 384/621 |
| 1,245,147 | 10/1917 | Harris et al. | 384/565 |
| 1,572,736 | 2/1926 | McPhail et al. | 384/565 |
| 1,672,012 | 6/1928 | Tyson | 384/565 |
| 2,266,888 | 12/1941 | McCurdy et al. | 384/550 |
| 3,545,830 | 12/1970 | Hewko | 384/548 |
| 3,734,584 | 5/1973 | Studer | 384/565 |
| 4,040,689 | 8/1977 | Stanley | 384/550 |
| 4,505,523 | 3/1985 | Stephan | 384/445 |

FOREIGN PATENT DOCUMENTS

| | | |
|---|---|---|
| 0697532 | 2/1996 | European Pat. Off. . |
| 340090 | 11/1921 | Germany . |
| 436331 | 11/1926 | Germany . |
| 9300316 | 4/1993 | Germany . |
| 1319591 | 6/1973 | United Kingdom . |
| 2084666 | 4/1982 | United Kingdom . |

OTHER PUBLICATIONS

Seiko et al, "Roller . . . Bearing", JP 5–340421, Patent Abstracts of Japan, M–1584, Mar. 29, 1994, vol. 18, No. 183.

*Primary Examiner*—Thomas R. Hannon
*Attorney, Agent, or Firm*—Bierman, Muserlian and Lucas

[57] ABSTRACT

A rolling bearing for rotary movements comprising an inner bearing ring (1), an outer bearing ring (2) and rolling elements in the form of rollers arranged between said inner and outer bearing rings for permitting a transmission of radial and axial forces from one bearing ring to the other, wherein the rollers form two different groups, the rollers of one group being configured as cylindrical rollers (4) having a circular cylindrical outer peripheral surface, while the rollers of the other group are configured as profiled rollers (5) having an outer peripheral surface comprising circular grooves arranged axially behind one another, whereby a rolling bearing having a high axial and radial bearing capacity is created.

4 Claims, 2 Drawing Sheets

ROLLING BEARING FOR ROTARY MOVEMENTS

FIELD OF THE INVENTION

A rolling bearing for rotary movements comprising an inner bearing ring, an outer bearing ring and rolling elements configured as rollers and arranged between said inner and outer bearing rings for permitting a transmission of radial and axial forces from one of said bearing rings to the other of said bearing rings.

BACKGROUND OF THE INVENTION

A bearing of the above type can be used as a fixed bearing wherever axial and radial forces have to be absorbed, for example in automobile construction, where they are used as wheel bearings, bevel pinion bearings in transmissions or as bearings for planet gears. EP-A-0 697 533 discloses a two-row taper roller bearing whose inner bearing ring is composed of two ring members having conical tracks, and a distance ring. The outer bearing ring likewise comprises two conical tracks for the taper rollers so that the structure of the bearing on the whole is very complicated and therefore expensive. Moreover, the flanges of the inner ring members against which the taper rollers are supported cause a high degree of friction.

OBJECTS OF THE INVENTION

It is an object of the invention to provide a rolling bearing having a high axial and radial bearing capacity which has a markedly compact structure and operates with a minimum of friction.

This and other objects and advantages of the invention will become obvious from the following detailed description.

SUMMARY OF THE INVENTION

The roller bearing of the invention for rotary movements comprising an inner bearing ring, an outer bearing ring and rolling elements configured as rollers and arranged between said inner and outer bearing rings for permitting a transmission of radial and axial forces from one of said bearing rings to other of said bearing rings, is characterized in that the rollers form two different groups, the rollers of a first group being configured as cylindrical rollers having a circular cylindrical outer peripheral surface, while the rollers of a second group are configured as profiled rollers having an outer peripheral surface comprising circular grooves arranged axially behind one another.

The cylindrical rollers can form a first circumferential row and the profiled rollers can form a second circumferential row and the two rows can be arranged axially behind each other in the bearing. In such an arrangement, the inner bearing ring and the outer bearing ring each comprises a circular cylindrical track section for the cylindrical rollers and, arranged axially therebehind, a profiled track section for the profiled rollers.

Alternatively, the cylindrical rollers and the profiled rollers can be arranged in alternating sequence in a single circumferential row in the bearing. In this case, the inner and the outer bearing ring each comprises a profiled track section having engagement grooves corresponding to the outer peripheral surface of the profiled rollers, there being formed between every two adjacent engagement grooves, a cylindrical surface for rolling contact with the cylindrical rollers.

The cylindrical rollers and the profiled rollers can be arranged in cages.

By the use of profiled rollers which engage into the profiled track sections of the bearing rings, the number of contact points between the rollers and the bearing rings is increased and this has a favorable effect on the transmission potential for axial forces. This results in a high basic load rating for axial forces. Since this also permits a reduction of Hertzian stress in the region of contact, friction is relatively low.

DETAILED DESCRIPTION OF THE DRAWINGS

Figure 1:
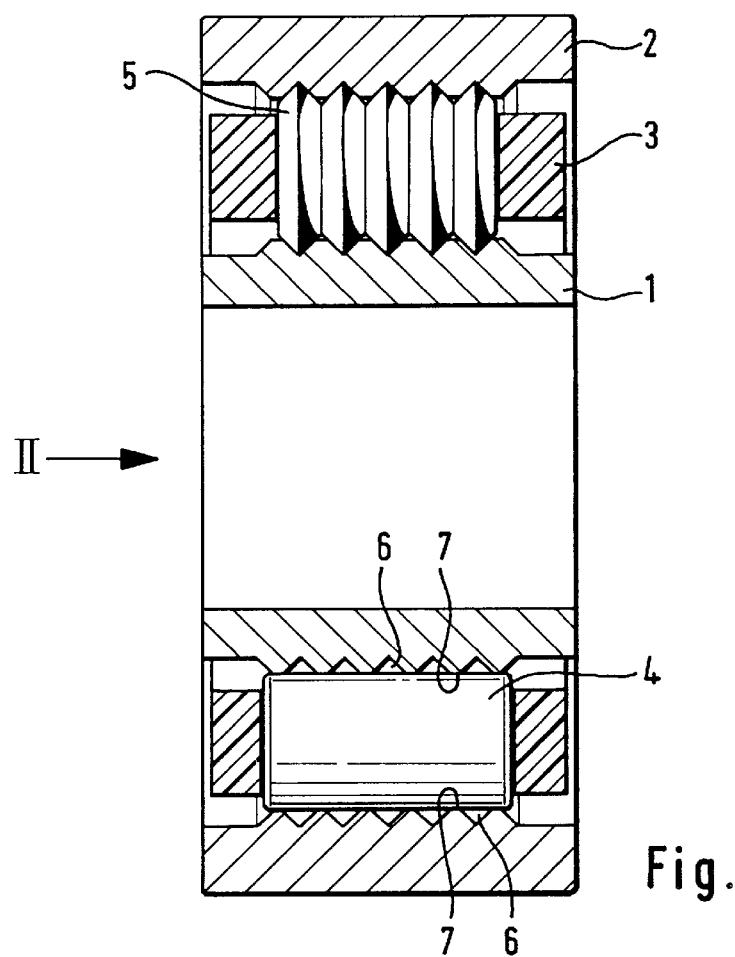
FIG. 1 is an axial section of a bearing of the invention showing a profiled roller and a cylindrical roller arranged in a cage.

In a bearing represented in FIG. 1, rolling elements configured as rollers forming two different groups are arranged in a cage 3 between an inner bearing ring 1 and an outer bearing ring 2. Cylindrical rollers 4 and profiled rollers 5 alternate with each other in peripheral direction. The cylindrical rollers 4 have a circular cylindrical outer peripheral surface while, the outer peripheral surface of the profiled rollers 5 comprises a plurality of circular grooves arranged axially behind one another. The inner and the outer bearing rings, 1 and 2, comprise appropriatedly configured engagement grooves 6 for the profiled rollers 5.

Due to the engagement of the profiled rollers 5 with their peripheral grooves into the engagement grooves 6 of the bearing rings, 1 and 2, axial forces can be transmitted from one bearing ring to the other through the profiled rollers 5. The transmission of radial forces, in contrast, is effected through the cylindrical rollers 4 for which cylindrical surfaces 7 are provided on the bearing rings, 1 and 2, to serve as tracks. Each cylindrical surface 7 is arranged between two engagement grooves 6. The inner bearing ring 1 and the outer bearing ring 2 thus comprise the engagement grooves 6 which are circular grooves and therefore have no lead. The regions of the profiled rollers 5 projecting radially between every two grooves of the profiled rollers 5 engage into these engagement grooves 6 of the bearing rings so that the transmission of axial forces is possible.

The cylindrical surfaces 7 formed on the bearing rings, 1 and 2, enable the cylindrical rollers 4 that are in rolling contact therewith to transmit radial forces. In addition, the cylindrical surfaces 7 serve to limit radial play in the bearing.

Figure 2:
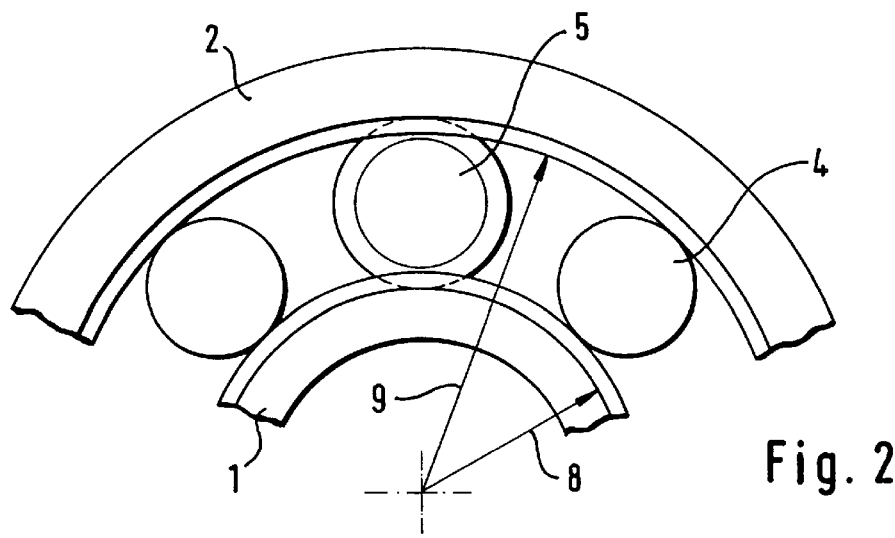
FIG. 2 is a partial view of the bearing of FIG. 1 seen in the direction of the arrow II of FIG. 1, but without a cage.

When the alternating cylindrical and profiled rollers, 4 and 5, have been lodged in the cage 3, care must be taken that all the rollers have the same peripheral speed. This can be achieved by an appropriate correction or adaptation of the pitch radii. FIG. 2 shows the pitch radius 8 of the inner bearing ring 1 and the pitch radius 9 of the outer bearing ring 2. This arrangement of the rollers results in a particularly compact bearing structure.

Figure 3:
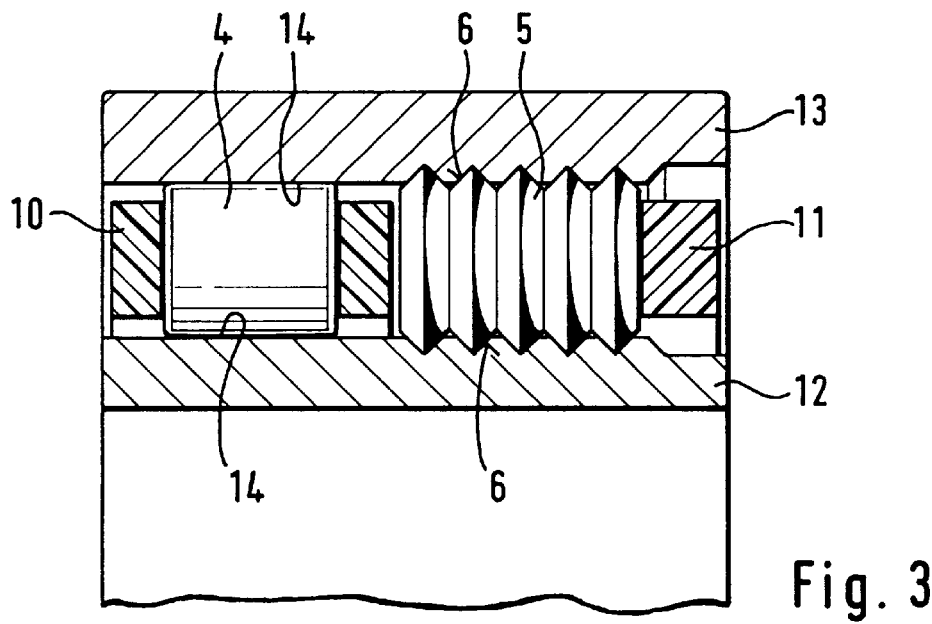
FIG. 3 is a partial axial section through a modified embodiment of the bearing of the invention.
Figure 4:
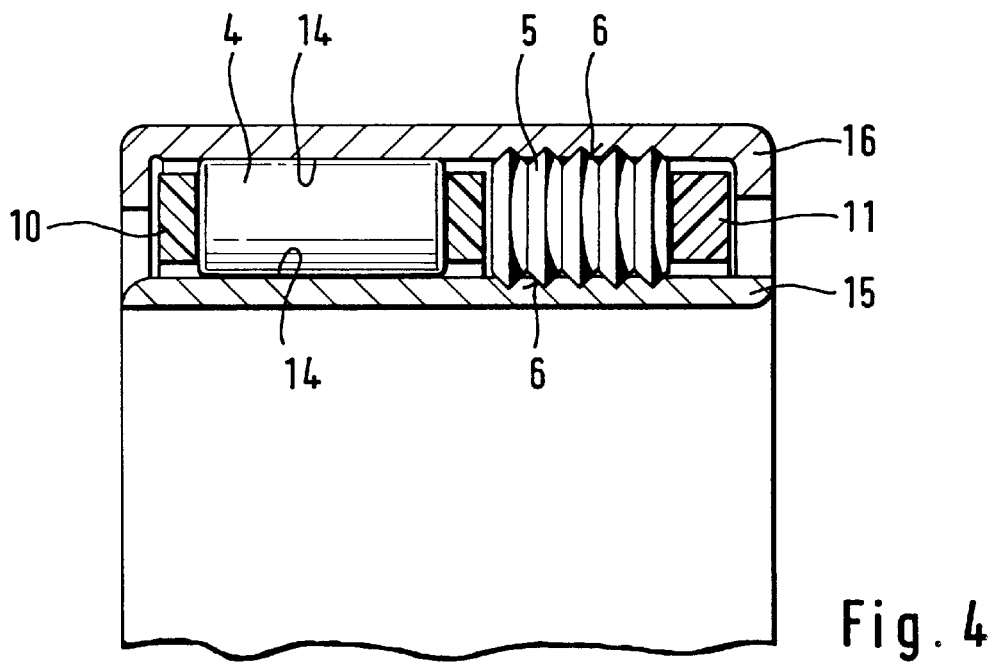
FIG. 4 is a partial axial section through a further modified embodiment of the bearing of the invention.

In the embodiments of FIGS. 3 and 4, the cylindrical rollers 4 and the profiled rollers 5 are arranged axially behind one another. The cylindrical rollers 4 are arranged in a cage 10 and form one row of rolling elements, while the profiled rollers 5 are arranged axially therebehind in a further cage 11 and form a further row of rolling elements in the bearing. Corresponding to this arrangement, the regions of the inner and the outer bearing rings having the engagement grooves 6 are arranged axially behind a region comprising cylindrical surfaces 14. Thus, in these embodiments, the cylindrical regions of the bearing rings 12 and 13 for the cylindrical rollers 4 have a larger axial extent than in the first embodiment. This solution is advantageously used when very high radial forces have to be transmitted. For reasons of assembly, the cages 10 and 11 are separate from each other. A configuration is also conceivable in which a row of cylindrical rollers 4 is arranged adjacent to the row of profiled rollers 5 on each side thereof, in which case, a cylindrical roller 4 would be shown on the left and on the right the profiled roller 5 in the drawing.

In contrast to FIG. 3, the embodiment of FIG. 4 comprises a chiplessly made inner bearing ring 15 and a likewise chiplessly made outer bearing ring 16. These rings can be made, for instance, by drawing and the profiled rollers 5 can be made by roller burnishing the grooves. This results in an economic variant for uses in which demands on precision are not high. By pressing the bearing into a housing or on to a shaft, the required degree of precision can be obtained.

Various modifications of the bearings of the invention may be made without departing from the spirit or scope thereof and it is to be understood that the invention is intended to be limited only as defined in the appended claims.

What I claim is:

1. A rolling bearing for rotary movements comprising an inner bearing ring, an outer bearing ring (2, 13, 16) and rolling elements configured as rollers and arranged between said inner and outer bearing rings for permitting a transmission of radial and axial forces from one of said bearing rings to other of said bearing rings, characterized in that the rollers form two different groups, the rollers of a first group being configured as cylindrical rollers having a circular cylindrical outer peripheral surface, while the rollers of a second group are configured as profiled rollers having an outer peripheral surface comprising circular grooves arranged axially behind one another wherein the cylindrical rollers and the profiled rollers are arranged in alternating sequence in a single circumferential row in the bearing.

2. A rolling bearing of claim 1 wherein the inner bearing ring and the outer bearing ring each comprises a profiled track section having engagement grooves corresponding to the outer peripheral surface of the profiled rollers, there being formed between every two adjacent engagement grooves, a cylindrical surface for rolling contact with the cylindrical rollers (4).

3. A rolling bearing of claim 1 wherein the cylindrical rollers and the profiled rollers are arranged in cages.

4. A rolling bearing of claim 1 wherein the inner bearing ring and the outer bearing ring are chiplessly made thin-walled components.

* * * * *